United States Patent [19]

Itoyama

[11] Patent Number: 4,731,127
[45] Date of Patent: Mar. 15, 1988

[54] THERMOCOUPLE DEVICE
[75] Inventor: Masaru Itoyama, Kanagawa, Japan
[73] Assignee: Kabushiki Kaisha Toshiba, Kawasaki, Japan
[21] Appl. No.: 933,308
[22] Filed: Nov. 21, 1986

Related U.S. Application Data

[63] Continuation of Ser. No. 749,901, Jun. 28, 1985, abandoned.

[30] Foreign Application Priority Data

Jun. 30, 1984 [JP] Japan ............................. 59-135915

[51] Int. Cl.⁴ ............................................. H01L 35/28
[52] U.S. Cl. ...................................... 136/228; 136/237
[58] Field of Search ......................................... 136/237

[56] References Cited

U.S. PATENT DOCUMENTS

| | | | |
|---|---|---|---|
| 813,682 | 2/1906 | Wilderman et al. | 136/226 |
| 2,186,707 | 1/1940 | Ray | 136/233 |
| 2,444,027 | 6/1948 | Becker et al. | 136/237 |
| 2,691,056 | 10/1954 | Wolff | 136/228 |
| 2,838,589 | 6/1958 | Hunrath | 136/228 |
| 2,898,933 | 8/1959 | Bancroft | 136/228 |
| 3,281,518 | 10/1966 | Stroud et al. | 136/237 |
| 3,296,033 | 1/1967 | Scuro et al. | 136/237 |
| 3,317,353 | 5/1967 | Bingham | 136/233 |
| 3,332,808 | 7/1967 | Ray | 136/217 |
| 3,364,079 | 1/1968 | Garno et al. | 136/237 |
| 3,973,997 | 8/1976 | Solomon | 136/237 |
| 4,006,039 | 2/1977 | Purdy | 136/237 |
| 4,021,268 | 5/1977 | Smith | 136/228 |
| 4,224,461 | 9/1980 | Snyder, et al. | 136/232 |

FOREIGN PATENT DOCUMENTS

| 2836 | of 1901 | United Kingdom | 136/233 |
|---|---|---|---|
| 1202199 | 8/1970 | United Kingdom | 136/233 |

OTHER PUBLICATIONS

"Thermal Free Soldering and Brazing Alloys", *IBM*, Manko.

Primary Examiner—Deborah L. Kyle
Assistant Examiner—T. J. Wallen
Attorney, Agent, or Firm—Cushman, Darby & Cushman

[57] ABSTRACT

A thermocouple device for detecting a flame. The device includes an outer thermocouple element having an excellent corrosion resistance and a large thermoelectromotive force, an inner thermocouple element, which is inserted into the outer thermocouple element, having a large thermoelectromotive force, and a junction layer securing end portions of the inner and outer thermocouple element. The junction layer is formed with a soldering material so as to avoid the formation of an alloy of the element materials that would have a poor corrosion resistance normally formed by welding.

3 Claims, 3 Drawing Figures

THERMOCOUPLE DEVICE

This is a continuation of application Ser. No. 749,901, filed June 28, 1985, which was abandoned upon the filing hereof.

BACKGROUND OF THE INVENTION

The present invention relates in general to thermocouple devices for flame detecting. Specifically, the present invention provides a thermocouple device particularly useful in situations requiring a high degree of corrosion resistance.

In certain industrial applications, it is necessary to sense the existence of a flame and automatically control a device in response to that sensing. For example, in a gas water boiler, it is desirable to sense a flame and maintain a flow of gas to a burner as long as the flame exists. Should the flame be extinguished, it is desireable to automatically control a valve to stop the gas flow.

One known device for flame sensing in such applications is the so-called flame-sensing rod. A flame-sensing rod is generally made of metal which is held near the flame. When a flame exists, an electric current flows between the flame-sensing rod and the burner. This current can be sensed to determine the existence of the flame. However a problem with using flame-sensing rods is that the current generated is quite small. In fact, it is too small to directly actuate any control device. The current must be sensed by a sensitive instrument and amplified.

An alternative device for flame sensing is the thermocouple device. A thermocouple device generally includes inner and outer thermocouple elements. The inner thermocouple element has a bar-shaped body that is made of a material, e.g. constantan, having a large thermoelectromotive force. The outer thermocouple element is formed as a cylindrical hollow body, which is made of a material, e.g. Inconel (a trade mark registered by the International Nickel Company), which is corrosion resistant, which surrounds the inner thermocouple element so as to prevent the inner thermocouple element from being corroded such as for example by water that may splash on the thermocouple device.

In conventional thermocouple devices, end portions of the thermocouple elements are joined by means of TIG (tungsten inert gas) welding. The end welded portion provides a detecting point which produces a large thermoelectromotive force when subjected to a flame. This thermocouple device has sufficient electric potential to directly drive a control circuit e.g. safety circuit. However, there is a drawback in this type of the thermocouple device. That is, the detecting point of the thermocouple device produced by welding is an alloy layer, including each metal of the thermocouple elements. The alloy has a corrosion resistance that is inferior to that of either of the individual metals of the thermocouple elements. When this thermocouple device is used in an environment where it may become wet, such as for detecting the flame of a gas-water boiler, the detecting point of the thermocouple device is apt to corrode. As a result of corrosion, the thermoelectromotive force is reduced. Therefore, there is a need to provide a flame sensor that not only provides a high thermal electromotive force, but also is corrosion resistant.

SUMMARY OF THE INVENTION

This invention addresses the above-described need by providing an improved thermocouple device. The thermocouple device of this invention is highly corrosion resistant and provides a sufficiently large electric potential in the presence of a flame to operate a control device.

According to the present invention, the thermocouple device is formed with an outer thermocouple element made of a high corrosion resistance material. The end portions of the inner and outer thermocouple elements are joined to each other not by welding, but rather by applying solder to their exposed ends. By soldering instead of welding, the low corrosion resistance alloy is not formed. The joined portion of the thermocouple elements has a corrosion resistance equal to that of the outer thermocouple element.

BRIEF DESCRIPTION OF THE DRAWINGS

The invention is best understood with reference to the accompanying drawings, in which.

DETAILED DESCRIPTION OF THE PREFERRED EMBODIMENT

An embodiment of the present invention will now be described in more detail with reference to the accompanying drawings.

Figures 1, 2:
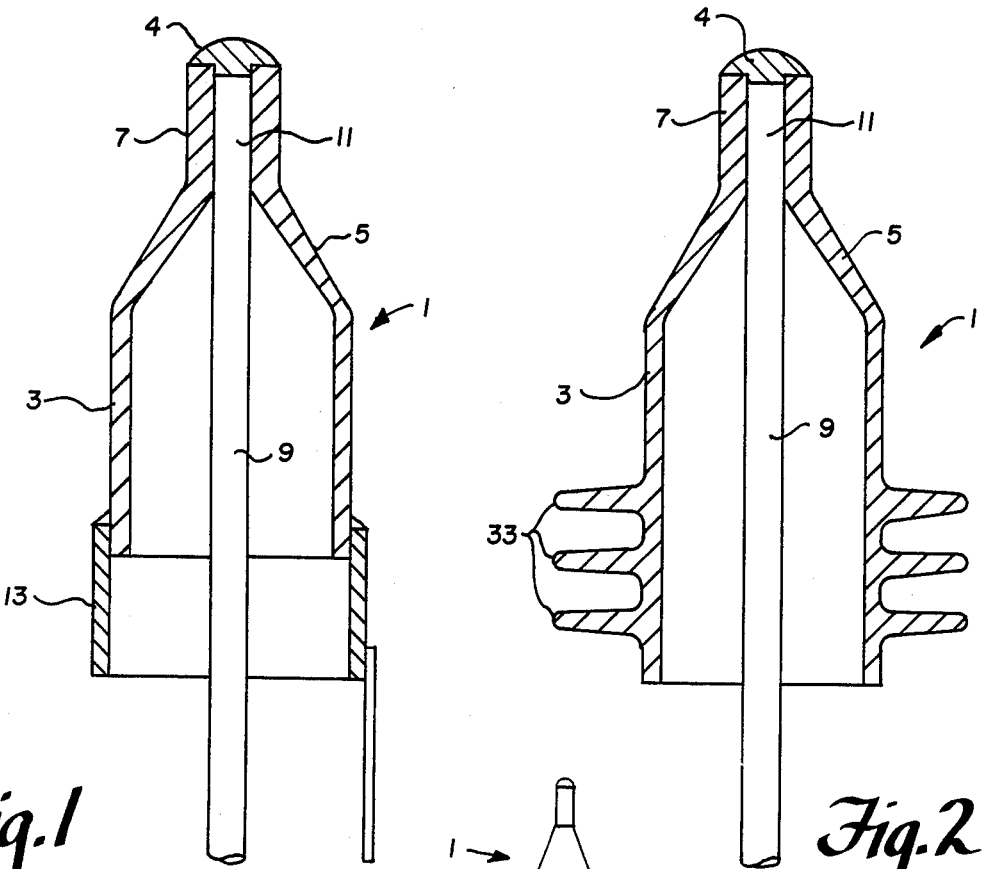
FIG. 1 is a sectional view of a thermocouple device in accordance with one embodiment of the present invention.
FIG. 2 is a sectional view of a thermocouple device in accordance with another embodiment of the present invention.

Referring to FIG. 1, there is shown a cross section of a thermocouple device according to a first embodiment of the invention. An outer thermocouple element 1 is made of a metal, e.g. Inconel 600, having an excellent corrosion resistance and a larger thermoelectromotive force. Inconel 600 is an alloy substance consisting of Cr:16% by weight, Fe:7% by weight and Ni balance. Element 1 is preferably formed as a single element including a cylindrical hollow body portion 3, a sloped hollow portion 5 and a cylindrical hollow end portion 7. Sloped hollow portion 5 is formed such that it becomes gradually smaller in diameter from the end of the cylindrical hollow body portion 3 toward cylindrical hollow end portion 7 whose diameter is smaller than that of the cylindrical hollow body portion 3. The thickness between inner and outer surfaces of cylindrical end portion 7 is greater than that of remaining portions of outer thermocouple element 1. An inner thermocouple element 9 is made of a metal, e.g. constantan having a large thermoelectromotive force. Inner thermocouple element 9 is formed in a bar-shape and is concentrically located within outer thermocouple element 1. That is, an end portion 11 of inner thermocouple element 9 is fitted into the inner space of the cylindrical hollow end portion 7 of outer thermocouple element 1 and extended to near the top portion of the cylindrical hollow end portion.

The top portions of inner thermocouple element 9 and cylindrical hollow end portion 7 of outer thermocouple element 1 are joined by means soldering them to one another using a soldering material to form a detecting point for detecting a flame.

The soldering material should have an excellent corrosion resistance, a large thermoelectromotive force and a good soldering ability. A soldering material best suited to the above conditions is chosen from the following group: Pt alloy, Pt, Au alloy, Au, Pd alloy, Pd, Ni alloy and Ni. Three examples of soldering material are as follows: (1) an alloy having 14% by weight Pt, 3% by weight Au and the balance Pd; and (2) an alloy having 31% by weight Pt, 49% by weight Au and the balance Pd; and (3) an alloy having 35% by weight Pd and the balance Au.

As shown in FIG. 1, furthermore, the other end of cylindrical hollow body 3 is inserted into a cylindrical hollow terminal 13 made of brass, and secured to the terminal by means of soldering.

Figure 3:
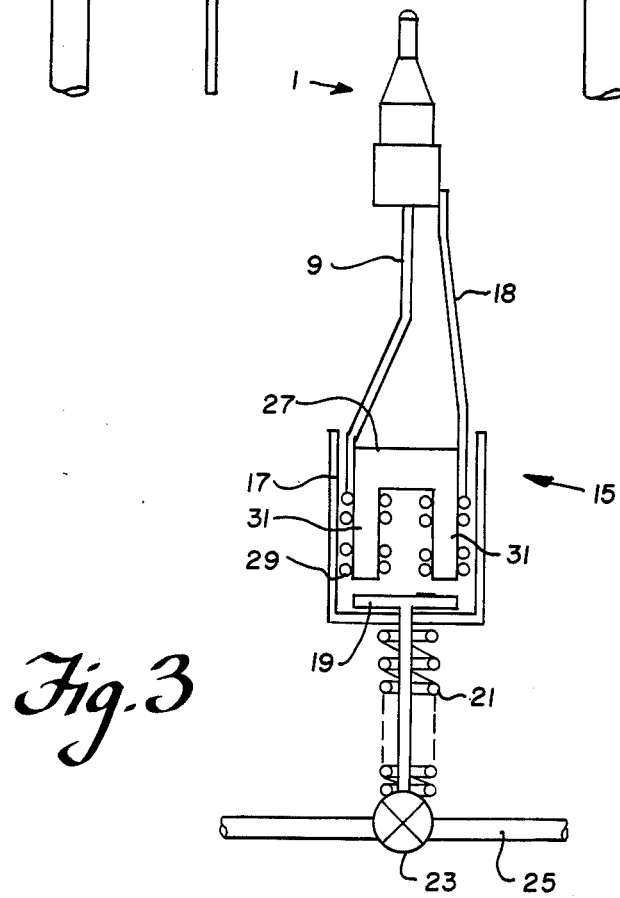
FIG. 3 is a schematic diagram showing a safety arrangement using the present invention.

Referring now to FIG. 3, cylindrical hollow terminal 13 is connected with a safety circuit arrangement 15 through a lead wire 18. The other end of inner thermocouple element 9, extending out of cylindrical hollow terminal 13, is also connected with the safety circuit 15. Safety circuit 15 includes an electromagnet 17, an actuator 19 being urged against the attractive force of the electromagnet 17 by a coil spring 21 and a valve 23 located in a path of a gas pipe 25. Electromagnet 17 includes a U-shaped core 27 and a coil 29, which is wound around leg portions 31, 31 of the core, one end of which is connected with wire 18, and the other end of which is connected with inner thermocouple element 9. The path of gas pipe 25 is closed or opened by the valve 23 in response to the reciprocating movement of actuator 19 when electromagnet 17 is energized or de-energized by the thermocouple device.

The thermocouple device thus constructed may be installed in an apparatus such as for example, a gas water boiler and may be used to detect the existence of a flame of its burner.

In one particularly useful arrangement, the thermocouple device can be located near a pilot flame of the gas burner. When the thermcouple device senses the pilot flame, its electromotive force can be used to open a main gas supply to a burner to be lighted by the pilot. The electromagnet 27 of the safety circuit is energized by the thermoelectromotive force, actuator 19 is attracted against the urging force of the coil spring 21, and then valve 23 of the gas pipe is opened in response to the movement of actuator 19 so that the main gas flows to a main burner (not shown). The main gas, thereby, is ignited by the pilot. The pilot is then extinguished after a flame appears on the main burner in a conventional manner, and the detecting point (solder layer 4) of the thermocouple device is continuously heated by the combustion flame of the main burner.

In the case of an accidental extinguishing of the main flame, valve 23 of gas pipe 25 is closed in response to the movement of actuator 19 by the urging force of coil spring 21. Electromagnet 17 is de-energized when there is no thermoelectromotive force provided by the thermocouple device.

In the embodiment described above, the detecting point (solder layer 4) of the thermocouple device is formed with the joint portion of both the end portions of the outer and inner thermocouple elements 1 and 9, and the joint portion is secured by means of soldering without melting the materials of the thermocouple elements. As a result, there is no alloy layer made of the materials of thermocouple elements 1 and 9 in the detecting point of the thermocouple device. And then, the outer peripheral wall of the detecting point which comes into contact with a corrosive material is highly corrosion resistant. Consequently, the detecting point of the thermocouple device has an excellent corrosion resistance without affecting the corrosion resistance of outer thermocouple element 1.

When using the thermocouple device according to the invention in a corrosive environment such as a gas water boiler, the detecting point of the thermocouple device should not become corroded. Therefore, it should operate successfully for an extended period of time with respect to known thermocouples. Further, the thermocouple device may drive a circuit such as a safety circuit without using any other circuits such as an amplifier.

FIG. 2 shows another embodiment of the present invention. In this embodiment, several cooling fins 33 are provided to that portion which extends from the end portion of the thermocouple element in place of cylindrical hollow terminal 13 of the above-identified embodiment. Cooling fins 33 promote a large temperature difference between the detecting point of the thermocouple device and the portion of the outer thermocouple element provided with the cooling fins which helps to produce a large thermoelectromotive force. The portions of this embodiment similar to that of the embodiment shown in FIG. 1 have the same reference numerals and therefore explanation of such elements is omitted.

In summary, it will be seen that the present invention overcomes the drawbacks of the prior art and provides improved thermocouple device having enhanced corrosion resistance of its detecting point.

Various modifications will become apparent for those skilled in the art having the benefit of the teachings of the present disclosure without departing from the scope thereof. Therefore, the claims should be construed to include such modifications.

What is claimed is:

1. A thermocouple device comprising:
   an outer thermocouple element having a hollow first end portion, said outer thermocouple element being made of a Fe-Cr-Ni alloy;
   an inner thermocouple element a first end portion fitted within the hollow first end portion of the outer thermocouple element, said inner thermocouple element being made of constantan; and
   a solder layer securing the respective first end portions of the inner and outer thermocouple elements to one another, said solder layer being an alloy having 14% by weight Pt, 3% by weight Au and the balance Pd.

2. A thermocouple device comprising:
   an outer thermocouple element having a hollow first end portion, said outer thermocouple element being made of a Fe-Cr-Ni alloy;
   an inner thermocouple element having a first end portion fitted within the hollow first end portion of the outer thermocouple element, said inner thermocouple element being made of constantan; and
   a solder layer securing the respective first end portions of the inner and outer thermocouple elements to one another, said solder layer being an alloy having 31% by weight Pt, 14% by weight Au and the balance Pd.

3. A thermocouple device comprising:
   an outer thermocouple element having a hollow first end portion, said outer thermocouple element being made of a Fe-Cr-Ni alloy;

an inner thermocouple element having a first end portion fitted within the hollow first end portion of the outer thermocouple element, said inner thermocouple element being made of constantan; and a solder layer securing the respective first end portions of the inner and outer thermocouple elements to one another, said solder layer being an alloy having 35% by weight Pd and the balance Au.

* * * * *